United States Patent [19]
Khan

[11] Patent Number: 5,274,229
[45] Date of Patent: Dec. 28, 1993

[54] ABSOLUTE POSITION ENCODER

[75] Inventor: Akhtar R. Khan, San Jose, Calif.

[73] Assignee: Hewlett-Packard Company, Palo Alto, Calif.

[21] Appl. No.: 713,718

[22] Filed: Jun. 11, 1991

[51] Int. Cl.⁵ .............................................. G01D 5/34
[52] U.S. Cl. ............................................... 250/231.18
[58] Field of Search ...................... 250/231.17, 231.18, 250/231.14, 2376; 341/13

[56] References Cited

U.S. PATENT DOCUMENTS 4,421,980 12/1983 Kühne ........................... 250/231.18
4,691,101 9/1987 Leonard ........................... 250/2376

FOREIGN PATENT DOCUMENTS

0143525 9/1984 European Pat. Off. .
59-226822 12/1984 Japan .

*Primary Examiner*—Vincent P. McGraw
*Assistant Examiner*—K. P. Hantis

[57] ABSTRACT

An optical shaft angle encoder has a circumferentially extending data track having alternating windows and opaque spaces or spokes between the windows. Each window and space between windows has substantially the same width along the track. An array of photodetectors is provided adjacent to the data track, with each photodetector having substantially the same width as a space or window. An LED illuminates the photodetectors through the windows. The lengths of each window transverse to the data track, and hence the area of each window, is selected from a limited set which preferably has lengths varying by powers of 2. The areas of successive windows along the track are in a predetermined sequence which does not repeat around the track. The photo current due to illuminating the photodetectors in the array provides a unique indication of the angular position of the code wheel. To assure a reading of the angular position at essentially all times, including immediately upon startup of the encoder, there are interleaved arrays of odd and even numbered photodetectors. Half-width selection photodetectors select one of the adjacent odd numbered photodetector currents to be added to each even numbered photodetector current so that the entire illumination through each window over the array is measured.

15 Claims, 5 Drawing Sheets

ABSOLUTE POSITION ENCODER

BACKGROUND OF THE INVENTION

This invention relates to position sensors or encoders such as an optical shaft angle encoder which produces electrical signals indicative of the angular position of the shaft. In particular, it relates to an encoder that provides a unique signal so that the position can be determined absolutely, rather than by reference to distance traveled from an index point or the like.

Incremental optical motion encoders are used to resolve the position and movement of an object along a particular route. Such encoders generally include a light source for emitting a light beam, light modulation means for modulating the light beam in response to movement of the object along the route, and a detector assembly for receiving the modulated light and producing electrical signals indicating the amount of light received by the detectors. The electrical signals from the detectors can be used to indicate the change in location of the object along the route. Multiple detectors are used to indicate both change in location and direction of movement.

Generally speaking, for an incremental motion encoder to produce an indication of the absolute position or location of the object its route, an index pulse is generated at least once along the route. Thereafter, incremental signals can be used to count incremental movement from the index pulse. When the position of the object is known at the index pulse, the absolute position of the object at any place along the route can be determined. To provide an indication of absolute position, change in location and direction of movement, an incremental encoder generally requires three channels of information. Two channels are derived from two or more out-of-phase encoder signals that are produced throughout the route of the object, and the third is an index signal that is produced at least once along the route and at a known position.

In an exemplary embodiment, such a position encoder or movement detector may be used for measuring the angular position of a shaft. Depending on the use of such a shaft angle encoder, a high degree of resolution and accuracy may be needed. It is not unusual to specify a resolution of 2,000 increments per revolution of the shaft. Accuracy of the correlation between the signal from the encoder and the actual mechanical position of the shaft or other object is also important. Mechanical alignment discrepancies in assembling apparatus can adversely affect accuracy. This may be particularly true where the information, i.e., the position track and the index track, are physically separated from each other. In a shaft angle encoder, the center of each of these tracks must be concentric to a high degree to obtain the desired accuracy.

It is desirable to provide an absolute encoder having a single track for position information. Absolute encoders are known, but are quite expensive.

In a conventional shaft angle encoder where position is obtained by reference to an index location, it is necessary upon "wake-up" of the instrument to search for the index so that absolute position can be determined. It is desirable to have a shaft angle encoder where absolute position can be determined immediately when the encoder is turned on. Thus, it is not necessary to rotate the shaft to find the index so that incremental counts can be made from the index.

BRIEF SUMMARY OF THE INVENTION

Thus, there is provided in practice of this invention according to a presently preferred embodiment, an optical encoder having a data track with a multiplicity of windows and opaque spaces between the windows. Each of the windows has a selected area from a set of areas which are distinguishable from each other. The areas of successive windows are in a predetermined sequence along the track. An array of photodetectors adjacent to the track spans a plurality of the windows, so that each photodetector is successively aligned or not aligned with a window during relative movement between the windows and photodetectors. Means are provided for illuminating the photodetectors through the windows and for determining the position of the windows relative to the photodetectors in response to the magnitude of illumination of each of the photodetectors.

Preferably, each window and each space between adjacent windows has the same width. A second array of photodetectors is interleaved between the photodetectors in the first array, and each of the photodetectors has the same width as a window or space. A set of selection photodetectors at an end of the array of data photodetectors is used for selecting photodetectors to be read. Each of the selection photodetectors has half of the width of a window or space. It is convenient to have the areas of the window differ by powers of n where n can be an integer or non-integer number for generating binary digital output signals. In an exemplary embodiment, the areas of the windows differ by powers of two.

BRIEF DESCRIPTION OF THE DRAWINGS

These and other features and advantages of the present invention will be appreciated as the same becomes better understood by reference to the following detailed description when considered in connection with the accompanying drawings, wherein.

DESCRIPTION

Figure 1:
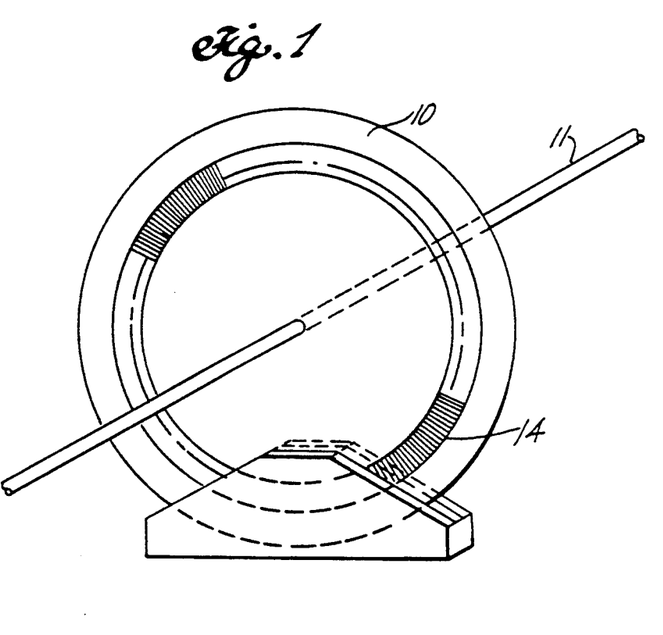
FIG. 1 illustrates schematically an exemplary shaft angle encoder suitable for practice of this invention.
Figure 2:
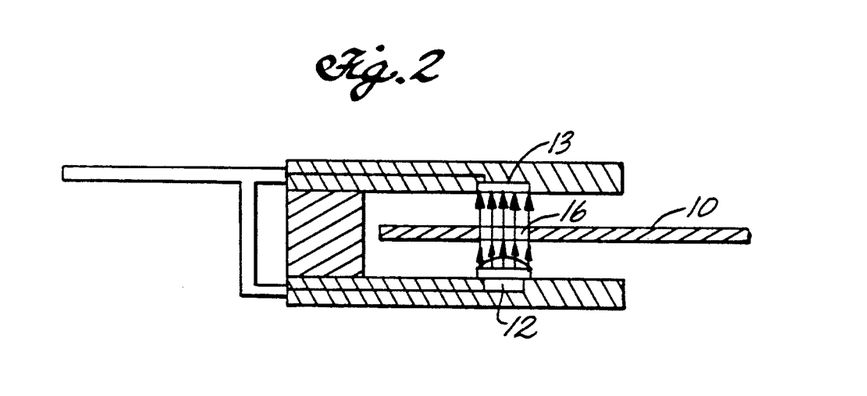
FIG. 2 is a fragmentary cross section transverse to the code wheel of the shaft angle encoder.

An exemplary shaft angle encoder has a code wheel 10 mounted on a shaft 11 for rotation between a light source 12 and a suitable array of photodetectors 13 for measuring light intensity transmitted through the code wheel. These structures are illustrated schematically since details of construction and assembly are largely immaterial and are well known to those skilled in the art.

It will also be apparent as the disclosure is considered that the invention is not limited to an angle encoder. It is also applicable to a position encoder where there is a linear track rather than a circular track. For that matter, a linear track could be considered as a limiting case of a circular data track with an infinite radius. It is, however, convenient for purposes of the specification and claims in this application to refer to the invention in a context of an angle encoder.

The light source may, for example, comprise one or more light-emitting diodes selected for a desired wavelength of radiation. When more than one LED is used, care should be taken to assure that the illumination from the several LEDs is uniform. A lens may be used for collimating light from the source for illuminating one face of the code wheel. Typically, the photodetectors are photodiodes formed as areas on an integrated circuit chip including other electronic components for processing the signals from the photodetectors.

The code wheel may be made of an opaque material with openings for windows, or of a transparent material metallized or otherwise coated to make selected areas opaque. Alternatively, the invention may employ a code wheel with reflective and nonreflective areas, with the light source and light detectors adjacent to the same face of the code wheel. For convenience in exposition, areas that transmit or reflect light are referred to as windows, and the spaces therebetween, which are opaque or non-reflective, are referred to as spaces, bars or spokes.

Figure 3:
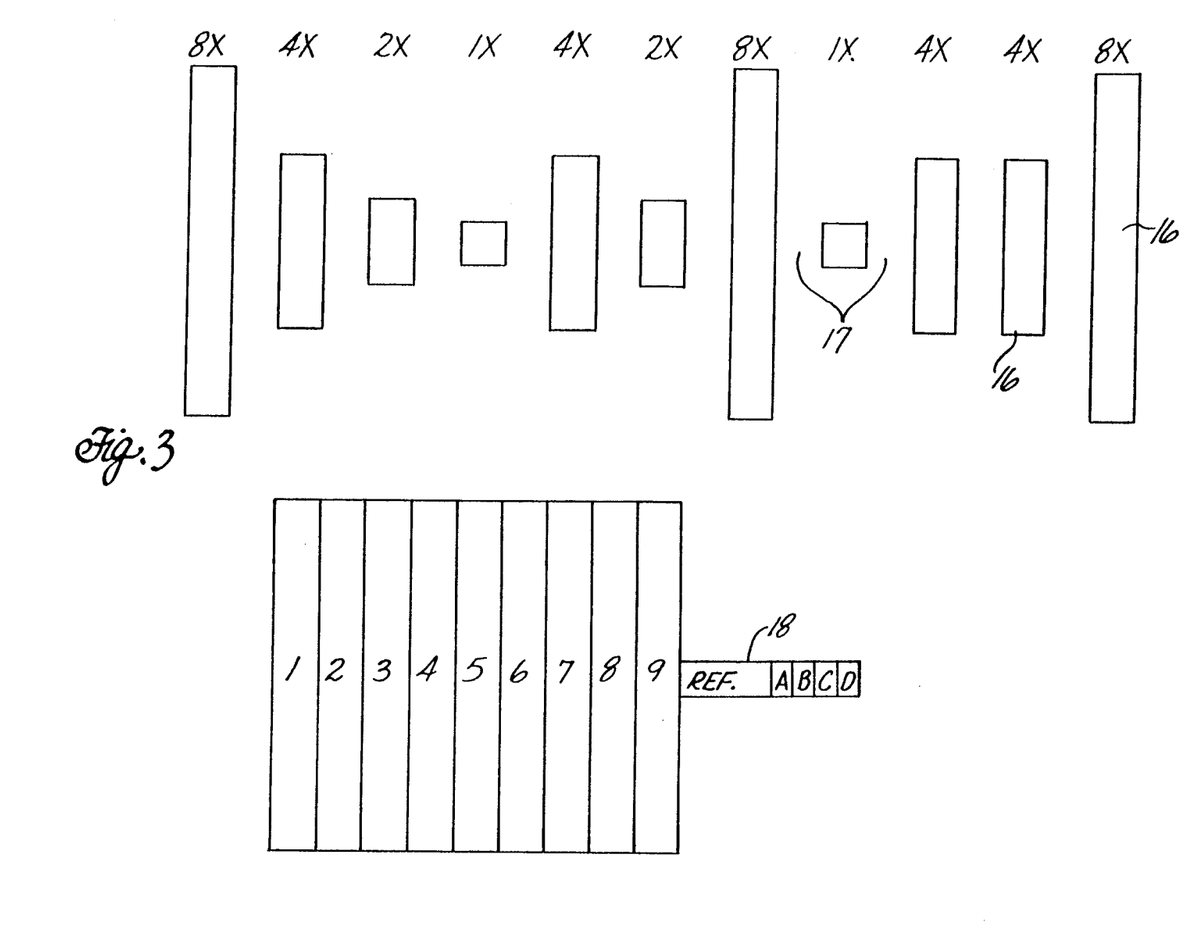
FIG. 3 is a schematic illustration of an exemplary pattern of windows and photodetectors for an encoder.

In a preferred embodiment as illustrated in FIGS. 1 to 3, the code wheel has a circumferentially extending data track or code track 14 having alternating transparent windows 16 and opaque spokes 17. A plurality of such windows extending along the length of the data track as illustrated schematically in the upper portion of FIG. 3, with each of the rectangular areas indicating a window 16. The spaces 17 between adjacent windows are opaque. In the lower portion of FIG. 3, a plurality of photodetectors numbered 1 through 9 are illustrated. The number of photodetectors in the array determine the number of adjacent windows and spaces along the data track to be detected in one pass. In this preferred embodiment, the even numbered photodetectors detect a view group containing 4 windows, the window pattern in the view group corresponding to an angular position of the shaft. It will be apparent that such windows, spaces and photodetectors in a shaft angle encoder are actually trapezoidal instead of rectangular as illustrated. Also, the windows are superimposed over the photodetectors in the encoder. This schematic illustration with the windows offset from the photodetectors is used for convenience and clarity.

Each of the windows of the shaft angle encoder has the same width along the data track as the spaces between adjacent windows. Similarly, each of the data photodetectors 1 to 9 has the same width as a window or space. Thus, when the windows are aligned with the photodetectors as indicated in the two halves of FIG. 3, the odd numbered photodetectors would each be illuminated through a window, and the even numbered photodetectors would be fully occulted by a spoke between the windows.

Each of the windows has a length transverse to the data track selected from a small set of lengths. In the embodiment illustrated, there are four lengths in the set differing from each other by powers of two. Thus, the areas of the windows differ from each other by powers of two. Some of the windows have a length or area of 1X units ($2^0$); some have a length or area of 2X units ($2^1$); some have a length or area of 4X units ($2^2$); and some have a length or area of 8X units ($2^3$).

It is desirable that the windows in a set differ from each other by powers of two, since this is easily converted to a binary digital number. Other ratios of window areas may be used, so long as the illumination through the windows can be distinguished by the photodetectors and converted to distinct digital numbers.

The windows are located in the data track so that the center of each window is at the same radius from the center of the code wheel. This is done since the windows are trapezoidal in a circular wheel instead of rectangular as illustrated schematically in FIG. 3, and the areas thereby have the same relative proportions as the lengths of the windows. The illumination through the windows should be uniform in the radial as well as the circumferential direction.

A reference photodetector 18 is located at the same radial distance from the center of the encoder and at one end of the array of data photodetectors 1 to 9. The reference photodetector has a "width" along the direction of the data track twice the width of a window or space between windows. Thus, regardless of the alignment of the windows and photodetectors, the reference photodetector is illuminated through the entire width of a window. This illumination may be through one window, or through parts of two adjacent windows. The "length" of the reference photodetector in the transverse direction across the data track is somewhat less than the length of the smallest of the windows, or 1X units. Thus, regardless of whether the reference photodiode is illuminated through a 1X window or an 8X window, it receives the same illumination. The length is less than a 1X window so that if there is some misalignment or non-concentricity, the reference photodetector is fully illuminated through a 1X window. This provides somewhat greater tolerance in manufacture and assembly than if the reference photodetector were the same length as the smallest windows.

Each of the data photodetectors has a length in the radial direction corresponding to the length of the largest of the windows, i.e., in the illustrated embodiment, 8X units. Thus, the illumination falling on a photodetector corresponds to the length of the window through which the illumination passes. This enables one to determine the area of the window aligned with a given photodetector.

The reference photodetector provides a reference current for the data photodetectors so that the magnitude of illumination of each data photodetector can be determined. One can readily determine that the illumination of a data photodetector is 1X, 2X, 4X or 8X the signal from the reference photodetector. This compensates for variation in illumination from the light source and avoids any need for absolute measurements of current.

The position of the windows relative to the photodetectors is determined from the array of even numbered data photodetectors which are interleaved between the odd numbered data photodetectors. Using only the even numbered photodetectors would work fine for determining position when the windows are well aligned with the even numbered photodetectors. It would not work well when the code wheel is rotated one-half an increment and the even numbered photodetectors are occulted by the opaque spaces between the windows, in which position there would be no signals at all from the even numbered photodetectors. The odd numbered data photodetectors are, therefore, used in combination with the even numbered data photodetectors for determining position upon "wake-up" when the encoder is first turned on. As explained hereinafter, they are also used throughout operation of the encoder.

Figure 4:
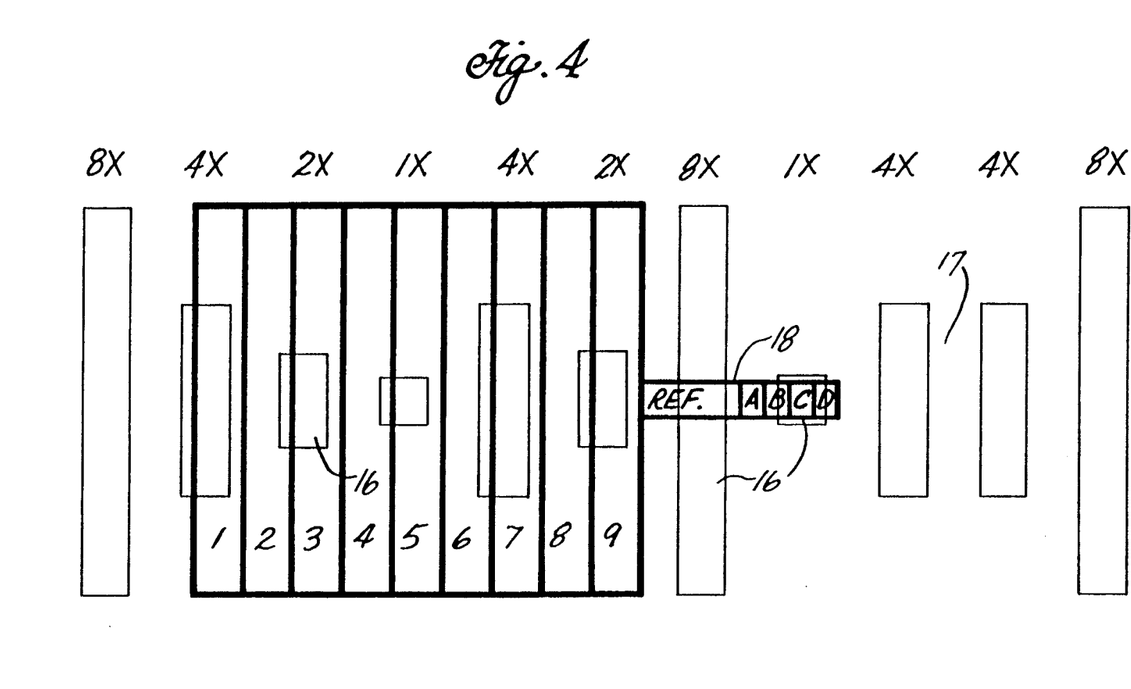
FIG. 4 is a schematic illustration of windows superimposed over photodetectors.

FIG. 4 illustrates schematically the windows of the data track superimposed over the photodetectors at an arbitrary position where the windows are not well aligned with either the odd or even numbered photodetectors. In this illustration, the photodetectors are drawn with relatively heavy lines to distinguish them from the windows which are drawn with relatively light lines. In addition, the data photodetectors are illustrated with a length slightly greater than 8X units, and the reference photodetector with a length slightly more than 1X units, so that the lines are not exactly superimposed. In practice, the photodetectors may actually be made slightly larger than the windows to ease alignment requirements during assembly of the encoder. Such enlargement should be relatively small so that the ratio between different size windows is no significantly changed.

In the alignment illustrated in FIG. 4, it will be noted that a 2X size window 16 illuminates a portion of each of data photodetectors 2 and 3. Similarly, a 1X window illuminates a portion of each of photodetectors 4 and 5. It will also be observed that the total illumination of the combination of photodetectors 2 and 3 corresponds to the area of the 2X window. Means are, therefore, provided for reading the sum of illumination of each even numbered window and a chosen adjacent odd numbered window. It is also necessary to determine whether the left or right adjacent odd numbered window is selected to add to the illumination of each even numbered window. This is significant since additional rotation of the code wheel causes the 2X window which is presently illuminating photodetectors 2 and 3 to later illuminate photodetectors 3 and 4. At such later rotation, the illumination photodetectors 4 and 3 should be added instead of photodetectors 2 and 3.

For this selection purpose, an additional array of four selection photodetectors A, B, C, D is provided at one end of the array. In the embodiment illustrated in FIG. 4, the selection photodetectors are located at the same end of the array as the reference photodetector 18. They could just as well be located at the opposite end of the array of data photodetectors.

Each of the selection photodetectors has a width along the direction of the data track one-half of the width of a window or space between windows. Preferably, the length of the selection photodetectors transverse to the data track is about 1X units, and the centers of the selection photodetectors are at the same radial distance from the center of the code wheel as the centers of the other photodetectors (and the windows).

The selection photodetectors are positioned so that when the windows are exactly aligned with the even numbered data photodetectors, a window is aligned with the center pair B, C of the selection photodetectors and the outside pair A, D is occulted by the opaque spaces between windows. When the windows are aligned with odd numbered data photodetectors, the center pair B, C of the selection photodetectors is occulted by a space between adjacent windows, and the outside pair A, D are each illuminated through one of a pair of adjacent windows.

In the arbitrary alignment illustrated in FIG. 4, it will be noted that one of the center selection photodetectors, C, is completely illuminated through a window, and the other center photodetector, B, and one of the outside photodetectors, D, are partially illuminated through the window. Comparing the illumination on photodetectors A+D and B+C provides the selection criterion for selecting the left or right odd numbered photodetector.

Figure 5:
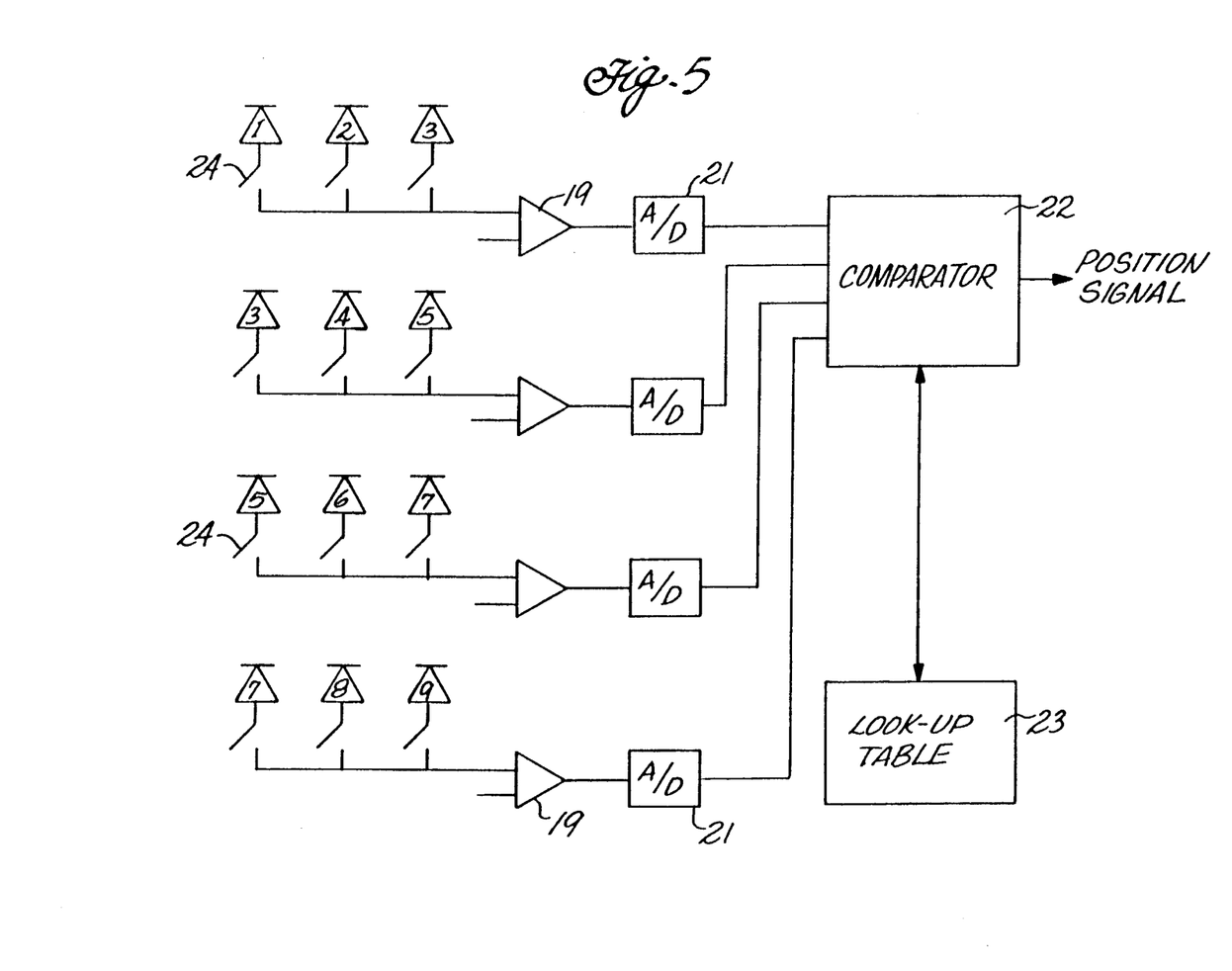
FIG. 5 is a schematic block diagram of the electrical portion of the encoder.

FIG. 5 illustrates schematically the electrical connection for providing a position signal from the encoder in response to illumination of the data photodetectors through 9. Each even numbered photodetector is switchably connected to a separate operational amplifier 19. For each even numbered photodetector, the adjacent odd numbered photodetectors are also switchably connected to the respective op-amp 19. Each op-amp output is connected to an analog-to-digital converter 21.

The switches 24 connecting each data photodetector with the respective op-amp are controlled by the selection photodetectors A, B, C, D. For example, when the windows are overlying the photodetectors as illustrated in FIG. 4, the total illumination on the center pair of selection photodetectors B and C is greater than the total illumination on the outside selection photodetectors A and D. When that condition exists, as indicated at the bottom of FIG. 6, the switches are activated to the positions illustrated in FIG. 6.

Because of this exemplary illumination of the selection photodetectors, the switches connecting photodetectors 2 and 3 to the first op-amp are closed, and the switch connecting the number 1 data photodetector to that op-amp is open. Thus, the total current due to illumination of photodetectors 2 and 3 is applied to the first op-amp. The illumination on data photodetector 1 is ignored. Thus, in this example, the signal from the first op-amp indicates that photodetector 2 plus its adjacent odd numbered photodetector 3 are illuminated by a window having an area of 2X. In a similar manner, the input signals to the comparator would show that photodetectors 4, 6 and 8 and their adjacent odd numbered photodetector are illuminated by windows having areas of 1X, 4X and 2X, respectively.

Figure 6:
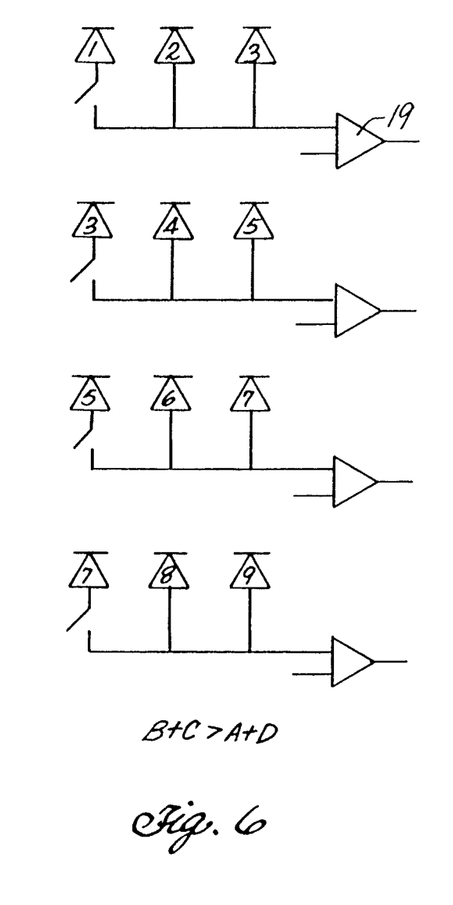
FIG. 6 is a schematic illustration of photodetector connections when windows are superimposed as illustrated in FIG. 4.
Figure 7:
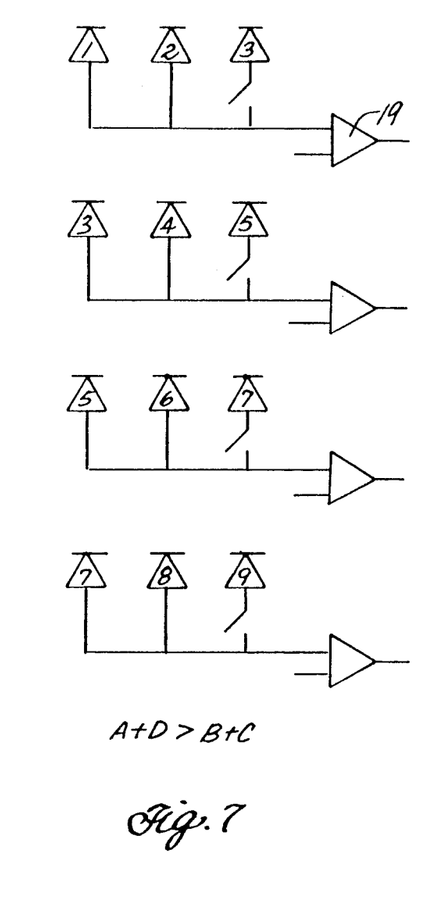
FIG. 7 is a schematic illustration similar to FIG. 6 for a different superposition of windows and photodetectors.

FIG. 7 is analogous to FIG. 6, and illustrates the switch positions when the windows are positioned over the photodetectors so that each window illuminates a portion of an even numbered photodetector and a portion of the odd numbered photodetector to its left. In this position, two adjacent windows cast more total illumination on the outside selection photodetectors A and D than on the inner pair of selection photodetectors B and C. This causes the switches for data photodetectors 1 and 2 to close, while the switch to data photodetector 3 is open. In this situation, the current due to illumination of photodetectors 1 and 2 is applied to the op-amp, and the illumination on photodetector 3 is ignored.

Since the window areas are essentially quantized by powers of 2, the output of each A/D converter 21 is a three-bit binary number. These numbers are fed to a comparator 22 which compares the four numbers from the four A/D converters with stored numbers in a look-up table 23 to determine the position of the code wheel relative to the photodetectors. The output of the comparator is a digital position signal indicative of the code wheel position. The position signal may be used in any conventional manner for indicating the shaft angle or other related information. Changes in the position signal may be differentiated to measure velocity according to the needs of the user of the shaft angle encoder.

Table I shows how the windows are superimposed over the data photodetectors as the code wheel rotates. The table is arranged as if the windows were stationary and the photodetectors moving. Whether rotation is clockwise or counter clockwise is arbitrary. The numbers in each row in the table represent the areas of sequential windows along the data track of the code wheel. The sequence of numerical values tabulated corresponds to the sequence illustrated in FIGS. 3 and 4.

Assuming that the encoder is started when the windows are in the position illustrated in FIG. 4, the first row in the table shows that the four even numbered photodetectors (and an adjacent odd numbered photodetector) are illuminated by windows having areas 2X, 1X, 4X and 2X, respectively. This is indicated by the vertical bars indicating the ends of the photodetector array and the underlining of the numerical values of the illuminating windows.

Assuming, then, the one window to window increment, windows having areas of 1X, 4X, 2X and 8X, respectively, overlie the even numbered data photodetectors (and an adjacent odd numbered photodetector). Similarly, an additional increment of clockwise rotation brings windows having areas 4X, 2X, 8X and 1X over the photodetectors, and still another increment illuminates the even numbered photodetectors through windows having areas 2X, 8X, 1X and 4X, respectively, as indicated in rows three and four of the table. Assuming then that the rotation of the code wheel reverses to counterclockwise, the first increment returns windows having areas of 4X, 2X, 8X and 1X over the even photodetectors, etc.

TABLE I

| | |
|---|---|
| Startup | 8X 4X |2X 1X 4X 2X| 8X 1X 4X 4X 8X ... |
| Clockwise | 8X 4X 2X |1X 4X 2X 8X| 1X 4X 4X 8X ... |
| Clockwise | 8X 4X 2X 1X |4X 2X 8X 1X| 4X 4X 8X ... |
| Clockwise | 8X 4X 2X 1X 4X |2X 8X 1X 4X| 4X 8X ... |
| Counter-Clockwise | 8X 4X 2X 1X |4X 2X 8X 1X| 4X 4X 8X ... |
| Counter-Clockwise | 8X 4X 2X |1X 4X 2X 8X| 1X 4X 4X 8X ... |

Table II indicates the signals corresponding to the positions of the windows shown in Table I. At startup, the current signals from the four op-amps are 2, 1, 4 and 2, respectively. These are converted to binary numbers and the comparator looks up this sequence of numerical values in the look-up table and discovers (for purposes of this example) that this corresponds to position 1 of the encoder. It therefore provides an output digital signal of 1 as set forth in Table II. When the code wheel moves an increment clockwise, the new sequence, 1, 4, 2, 8, is found to be position 2, etc.

TABLE II

| | Current Signals | | | | Binary Output |
|---|---|---|---|---|---|
| Startup | 2 | 1 | 4 | 2 | 0000000001 |

TABLE II-continued

| | Current Signals | | | | Binary Output |
|---|---|---|---|---|---|
| Clockwise | 1 | 4 | 2 | 8 | 0000000010 |
| Clockwise | 4 | 2 | 8 | 1 | 0000000011 |
| Clockwise | 2 | 8 | 1 | 4 | 0000000100 |
| Counterclockwise | 4 | 2 | 8 | 1 | 0000000011 |
| Counterclockwise | 1 | 4 | 2 | 8 | 0000000010 |

The sequence of areas of windows around the code wheel is selected so that no sequence of four adjacent windows repeats at any point along the data track. With a set of four even numbered data photodetectors and the capability of detecting four levels of analog signals representing illumination of those photodetectors, one can identify $4^4$ or 256 unique code wheel positions. As the number of analog values detected increases, or the number of even numbered data photodetectors increases, the possible number of discrete locations to be detected increases geometrically. Thus, for example, with a set of five photodetectors capable of detecting five different levels of analog signals, the number of positions increases to $5^5$ or 3,125. An encoder with eight photodiodes and capable of detecting four levels of analog values permits detection of $4^8$ or 65,536 unique locations.

The absolute encoder can identify any position around the code wheel upon startup, with the possible exception when each of the even numbered photodetectors and their adjacent odd numbered photodetectors are exactly half-way illuminated. In that rare circumstance, the photo currents from the two sets of selection photo detectors would be equal; i.e., $B+C=A+D$. There are a number of possible ways to resolve this dilemma. The photo currents of odd numbered photodetectors adjacent to an even numbered photodetector may be compared and appropriate switches closed for connecting the odd numbered photodetectors with illumination equal to the even numbered photodetectors to the respective op-amps. Alternatively, one may simply wait for a slight movement of the code wheel to unbalance two selection photodetectors and resolve the uncertainty. Also, one may arbitrarily "tilt" the balance optically or electrically in one direction or the other and resolve the uncertainty. Alternatively, such a state may be inherently metastable and randomly "fall" to one side or the other. At worst, the position error is only one half of a window to window increment.

The resolution of this absolute encoder is one complete electrical cycle; that is, the sum of the widths of a window and an adjacent spoke. If desired, an approximate position interpolation may be provided by comparing the photo current of an even numbered photodetector with the appropriate adjacent odd numbered photodetector. The ratio indicates approximately the position of the window relative to the photodetectors. The interpolation photodetectors may be a pair of data photodetectors providing the analog signals to the op-amps, or a nearby set of additional photodetectors at an end of the array.

Although only one embodiment of optical encoder embodying principles of this invention has been described and illustrated herein, it will be understood that many modifications and variations may be made. Thus, as suggested throughout the description, the number of photodetectors and analog window areas may be varied to provide the angular resolution desired. Similarly, the data track may be used in a linear position encoder instead of the rotating shaft angle encoder described for illustrative purposes. The signal processing is merely exemplary and may differ appreciably from what is described. It will therefore be understood that, within the scope of the appended claims, the invention may be practiced otherwise than as specifically described.

What is claimed is:

1. An optical encoder for indicating an angular position of a shaft out of a set of possible angular positions, comprising:
    a wheel, axially mounted on the shaft, for rotating with the shaft;
    a data track, circumferentially positioned along the wheel, having transmissive windows and non-transmissive blocks;
    illumination means, positioned adjacent to the wheel, for emitting light through the data track;
    wherein each window of the data track has an area capable of passing an emitted light level, each emitted light level corresponds to one of at least two different window areas;
    wherein the data track is operative for passing two or more of the emitted light levels;
    wherein each possible angular position of the shaft has a view group of N windows of the data track, where N is an integer between two and the total number of windows of the data track;
    a first array of separated photodetectors, positioned adjacent to the wheel for receiving and measuring emitted light passing through the windows of a particular view group as the shaft rotates; and
    evaluation means, connected to the first array, for receiving the measurements and for determining the angular position of the shaft.

2. An optical encoder as claimed in claim 1, wherein each window has an area having width and length, each different window area corresponding to one of the emitted light levels.

3. An optical encoder as claimed in claim 2, wherein the window widths are uniform, the windows have varying lengths which correspond to one of at least two different emitted light levels.

4. An optical encoder as claimed in claim 2, wherein each detector in the first array has an area equal to that of the maximum window area.

5. An optical encoder as claimed in claim 4, wherein the photodetectors of the first array are uniformly separated, the uniform separation being equal to the width of the non-transmissive blocks.

6. An optical encoder as claimed in claim 4, further comprising:
    a reference detector, positioned adjacent to the wheel and connected to the evaluation means, for measuring a minimum emitted light level passing through the smallest window area of the data track, the reference detector having twice the uniform width and a length equal to the minimum length of the window areas;
    wherein the areas of the windows differ by multiples of A where A is the smallest window area; and
    wherein the evaluation means determines the minimum emitted light level, the minimum emitted light level being used to determine the emitted light levels from the measurements.

7. An optical encoder as claimed in claim 5, further comprising a tolerance array of photodetectors, interleaved and abutted with the photodetectors of the first array and connected to the evaluation means, for receiving emitted light passing through the windows of the data track when the first array and the windows of the data track are misaligned, wherein each photodetector in the tolerance array has a width equal to that of the non-transmissive blocks.

8. An optical encoder comprising:
    a data track with a multiplicity of windows, each window having an area selected from a set of areas which are distinguishable from each other, the areas of successive windows being in a predetermined sequence, wherein the sequence of areas of windows in any interval corresponding to the number of photodetectors in the array does not repeat throughout the length of the data track;
    an array of photodetectors adjacent to the data track sufficient to span a plurality of windows, each photodetector being successively aligned or not aligned with a window during relative movement between the windows and photodetectors;
    means for illuminating the photodetectors through the windows; and
    means for determining the position of the photodetectors relative to the windows in response to the magnitude of illumination of each of the photodetectors through the windows.

9. An optical encoder comprising:
    a data track having alternating windows and opaque spaces between windows, the width of each window and each space between windows being the same along the length of the track, the length of each window transverse to the length of the track being selected from a set of lengths which are distinguishable from each other, the length of successive windows along the track being in a predetermined sequence;
    an array of side-by-side data photodetectors adjacent to the track, each data photodetector having a width corresponding to the width of a space or window and a length corresponding to the length of the longest windows in the set;
    means for illuminating the data photodetectors through the windows;
    means for summing the photo currents due to illumination of a pair of adjacent data photodetectors; and
    means for determining the position of the data track relative to the photodetectors in response to the sum of photo currents of several pairs of data photodetectors in the array.

10. An optical encoder as recited in claim 9 further comprising means for selecting the pairs of photo currents summed.

11. An optical encoder as recited in claim 10 wherein the means for selecting comprises an array of side-by-side selection photodetectors at an end of the array of data photodetectors, each selection photodetector having one half the width of a window or space.

12. An optical encoder as recited in claim 9 further comprising a reference photodetector at an end of the array of data photodetectors having a width along the track twice the width of a window or space and a length transverse to the track less than the length of the shortest length of window in the set.

13. An optical encoder as recited in claim 9 wherein the lengths of the windows differ by powers of two.

14. An optical encoder as recited in claim 9 comprising means for converting the photo currents of a plurality of pairs of adjacent data photodetectors to a digital signal; and means for correlating the digital signal to a relative position of the windows and photodetectors.

15. An optical encoder for indicating an angular position of a shaft out of a set of possible angular positions, comprising:

a wheel, axially mounted on the shaft, for rotating with the shaft;

a data track, circumferentially positioned along the wheel, having transmissive windows and non-transmissive blocks;

illumination means, positioned adjacent to the wheel, for emitting light through the data track;

wherein each window of the data track has an area capable of passing an emitted light level, each emitted light level corresponds to one of at least two different window areas;

wherein the data track is operative for passing two or more of the emitted light levels;

wherein each possible angular position of the shaft has an associated view group of N windows of the data track, where N is an integer between two and the total number of windows of the data track;

a first array of photodetectors, positioned adjacent to the wheel, for receiving and coarse measuring emitted light passing through the windows of a particular associated view group as the shaft rotates;

a tolerance array of photodetectors, interleaved with the photodetectors of the first array, for receiving emitted light passing through the windows of the data track when the first array and the windows of the data track are misaligned, for fine measuring the emitted light passing through the windows;

a selection array of photodetectors, positioned adjacent to the wheel, for receiving and selection measuring emitted light passing through the data track as the shaft rotates;

a first evaluation means, connected to the selection array, for receiving the selection measurements, for determining the direction of the misalignment;

the misalignment direction indicating which detectors in the tolerance array should be fine measured in combination with the coarse measurements; and a second evaluation means, connected to the first array, the tolerance array, and the first evaluation means, for receiving the coarse and fine measurements and for determining the angular position of the shaft when the first array and the windows of the data track are misaligned.

* * * * *